Figure 1:
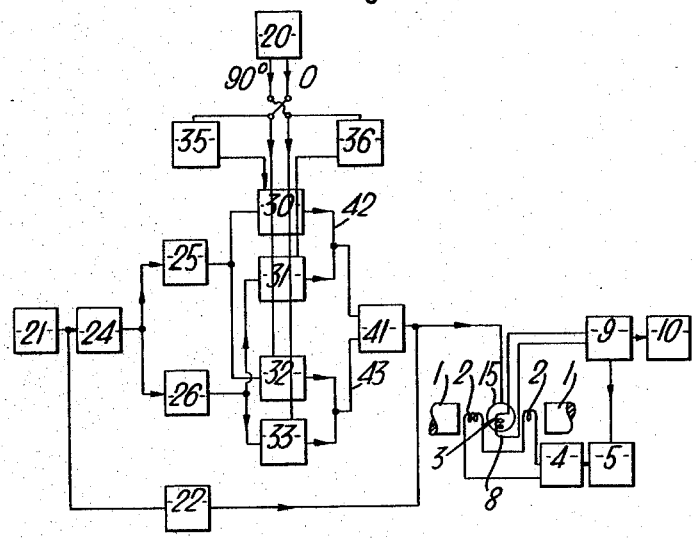

Nov. 2, 1965                D. W. TURNER                3,215,930
SPIN DECOUPLING MAGNETIC RESONANCE APPARATUS AND METHOD
Filed June 7, 1962

Inventor
DAVID W. TURNER
By
Attorney

United States Patent Office 3,215,930
Patented Nov. 2, 1965

3,215,930
SPIN DECOUPLING MAGNETIC RESONANCE
APPARATUS AND METHOD
David Warren Turner, Acton, London, England, assignor
to Perkin-Elmer Limited
Filed June 7, 1962, Ser. No. 200,836
Claims priority, application Great Britain, June 8, 1961,
20,805/61
10 Claims. (Cl. 324—.5)

The present invention is concerned with apparatus and methods for testing volumes of matter by means of magnetic resonance phenomena (for example nuclear magnetic resonance phenomena). In such testing, the matter under investigation is subjected both to a polarising direct magnetic field and to an inclined radio frequency magnetic field produced by an R.F. signal. If the strength of the direct field is gradually changed, then at some particular value of this field, particles, for example atomic nuclei, contained in the matter resonate at some frequency, and if all the particles have the same Larmor frequency, only a single resonance line is detected and this is easy to interpret. If, however, the matter is made up of a number of groups of particles which have different Larmor frequencies and which are spin-spin coupled together, the single resonance line of one group is split up into a number of resonance lines by virtue of the spin-spin coupling and the interpretation of these lines is sometimes difficult. This problem has been overcome by applying a second alternating magnetic field which is sufficiently strong as to disturb the spin-spin coupling between the two groups of particles and which is of such a frequency that this disturbing is done whilst the R.F. signal is effecting resonance of one of the groups of particles. In this way, it becomes possible to change the number of (generally to decrease) the resonance lines produced and if the disturbance of the spin-spin coupling is sufficient, only a single resonance line for the said one group may be produced for detection, or the spectrum may be simplified. This technique also permits the detection of the presence of spectral lines which are hidden or obscured by a multiplicity of other lines having the same or a similar chemical shift location. Thus, by disrupting the coupling between the particles producing the hidden line and particles producing lines clear of the obscured region, the number of these latter lines may be changed, thereby giving an indication of the presence and location of the obscured line.

The second alternating signal is conveniently provided when the spin-spin coupled groups are of like species, e.g. protons, by means of a source which is arranged so as to modulate the R.F. signal creating the first alternating magnetic field. In this way, the radio frequency signal and two sidebands become available for application to the matter under investigation.

The application of both sidebands to the matter under investigation is often disadvantageous and according to the present invention, therefore, one of these sidebands is substantially suppressed. Thus in a magnetic resonance apparatus in accordance with the invention, a source of alternating signals is arranged so as to modulate radio frequency signals produced by a second source, and means is provided for substantially suppressing one of the two sidebands produced, and conductors are arranged to convey the radio frequency signal and the unsuppressed sideband to a location between the poles of the polarising magnet of the apparatus so as to apply to this location corresponding alternating magnetic fields which are inclined to the direct field provided by the magnet of the apparatus. When such apparatus is employed to test matter, the R.F. signal and the unsuppressed sideband serve as a means for effecting resonance of some of these particles and for disrupting spin-spin coupling between particles at the location, not necessarily respectively.

A method of testing a volume of matter in accordance with the invention, in which the matter includes at least two groups of particles which have different Larmor frequencies and which are spin-spin coupled, involves subjecting the matter both to a polarising direct magnetic field and to an alternating field derived from an R.F. signal and a single sideband signal produced by modulating the R.F. signal and substantially suppressing one of the two sidebands produced, one of these signals being sufficiently strong to disturb the spin-spin coupling between the two groups of particles and being of such a frequency that this is done whilst the other signal is effecting resonance of one group, such resonance being detected. Preferably the spin-spin coupling is disturbed to such an extent that only a single resonance line for the said one group is produced for detection.

In apparatus or a method in accordance with the invention, it is preferred that the first source be adjustable to provide signals of different frequency. In this way, it becomes possible to separate the sideband from the R.F. signal by differing amounts corresponding to the differences between the Larmor frequencies of particles in different volumes of matter.

In one convenient arrangement, separate conductors are employed for the conveyance of the R.F. signal and the unsuppressed sideband. An attenuator may be provided to attenuate the R.F. signal derived from the second source so that a comparatively weak R.F. magnetic field is applied to the location between the poles of the magnet. Alternatively, however, the means for substantially suppressing one of the two sidebands may be adjusted to permit the passage of the radio frequency signal in an attenuated form so that the latter and the unsuppressed sideband may be applied to the location through common conductors.

Preferably the unsuppressed sideband signal is substantially stronger than the R.F. signal so that the former is responsible for the disturbance of the spin-spin coupling and the latter is responsible for causing resonance of the said one group.

When the particular group under investigation is spin-spin coupled to only one other group, the application of the R.F. signal and the unsuppressed sideband is able to produce the desired simplification of the spectrum, but when the group is spin-spin coupled to more than one group, the spectrum may still be more complex than is desired. Accordingly one or more further unsuppressed sidebands may be produced in accordance with the invention to disturb the further couplings. Thus if desired a third source of alternating signals may be arranged to modulate the R.F. signals produced by the second source and means may be provided which substantially suppresses one of the two sidebands produced, the unsuppressed sideband being conveyed to the location between the poles of the magnet to apply a corresponding alternating field for disturbing the coupling.

The invention may be applied to the various types of nuclear magnetic resonance apparatus. Thus the apparatus may be of the kind in which it is the direct magnetic field which is gradually changed to effect resonance, or it may be of the kind in which this is brought about by gradually changing the frequency of the R.F. signal. The alternating fields may also be applied to the location either through a single common coil or through separate coils. The pick-up head which is used to detect resonances may be separated from or alternatively constituted by the coil or coils for the application of these alternating signals.

Figure 2:
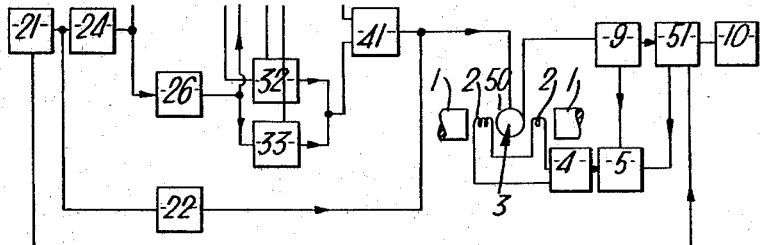

A nuclear magnetic resonance apparatus and method will now be described, by way of example, with reference to the accompanying drawings in which:

FIGURE 1 is a circuit diagram of one apparatus; and
FIGURE 2 is a similar diagram showing a modification of the apparatus.

The apparatus includes a permanent magnet having facing poles 1 between which are disposed coils 2 for causing a gradual change in the direct magnetic field applied to a location 3, this being brought about by a sweep generator 4 connected to supply the time base for an oscilloscope 5. Disposed at the location 3 is a pick-up head 8 in the form of a coil which is arranged perpendicular to the direct magnetic field and which serves to pick-up signals and pass them to an amplifier and detector circuit 9 (the amplifier having a crystal filter to suppress the disturbing signal) which passes the detected and amplified signals on to the oscilloscope 5 for display purposes and to a recorder 10 which provides a visual record of the signals.

The matter under investigation is placed at the location 3 and is subjected to an alternating magnetic field derived from a coil 15 arranged perpendicular to both the pick up head 8 and the direct magnetic field. This coil 15 is provided with signals from a modulator which includes four modulation circuits 30–33 and which receives alternating signals from a first source 20 and R.F. signals from a second source 21, the alternating signals from the source 20 serving to modulate the R.F. signals from the source 21. The R.F. signals are applied through an attenuator 22 directly to the coil 15 and are made of sufficient strength as to effect resonance of the particular group of particles under investigation. In the modulator R.F. signals are also applied through a buffer amplifier 24 to two phase-shifting devices 25 and 26 arranged in parallel. The device 25 serves to shift the phase by $+45°$, whilst the device 26 serves to shift it by $-45°$. The phase shifted R.F. signals from the device 25 are then fed in parallel to the modulation circuits 30 and 32, whilst phase shifted signals from the device 26 are fed to the modulation circuits 31 and 33. These circuits 30 to 33 also receive alternating signals derived from the source 20 which provides two alternating signals having a phase difference of $90°$. One of these signals is fed directly to the circuit 33 whilst the other is fed directly to the circuit 32. The respective signals are also fed through phase shifting devices 35 and 36 which shift the phase by $180°$ and the phase shifted signals are then applied to the circuits 31 and 30 respectively. The circuits 30 to 33 serve to modulate the incoming R.F. signals with the alternating signal derived from the source 20. The resultant modulated signals from the circuits 30 and 31 are added together and the resultant modulated signals from the circuits 32 and 33 are added together. It will be shown later that as a result of each of these additions one of the two sidebands produced by the modulation is suppressed. The remaining sideband from the circuits 30 and 31 and the remaining sideband from the circuits 32 and 33 are then applied in antiphase to an amplifier 41 and thence to the coil 15.

That suppression of one of the two sidebands is effected can be seen from the following somewhat simplified mathematical considerations. Suppose that the two signals from the sources 20 and 21 are represented by $\sin w_1 t$ and $\sin w_2 t$ respectively (there may be a phase difference between these two signals but this is unimportant and does not affect the results obtained later). It will be appreciated that the signals derived from the circuits 25 and 26 respectively are represented by $\sin (w_2 t + 45)$ and $\sin (w_2 t - 45)$, whilst the signals applied to the circuits 30–33 from the source 20 are represented by:

$\sin (w_1 t + 180)$, $\sin (w_1 t + 270)$, $\sin (w_1 t)$, $\sin (w_1 t + 90)$

If the multiplying transfer functions of the circuits 30–33 are equal to one another and of magnitude $A_0$ then signals are obtained at the lines 42 and 43 respectively which are represented by:

$A_0 \sin (w_2 t + 45)$, $\sin (w_1 t + 180) + A_0 \sin (w_2 t - 45)$,
$\sin (w_1 t + 270)$ and $A_0 \sin (w_2 t + 45) \sin (w_1 t) + A_0$
$\sin (w_2 t - 45) \sin (w_1 t + 90)$ When this is simplified the resultant signals are represented by $A_0 \cos \overline{(w_2 + w_1 t + 45)}$ and $-A_0 \cos \overline{(w_2 + w_1 t + 45)}$ respectively. It will be noticed that there are no terms in $(w_2 - w_1)t$. The two signals are applied in antiphase to the amplifier 41 to give an amplified sideband for application to the coil 15.

In the event of the sideband required being the one in terms of $(w_2 - w_1)t$—the sideband in terms of $(w_2 + w_1)t$ being suppressed—it is merely necessary to interchange the connections from the source 20 to the rest of the circuit.

It will be appreciated that the modulation circuits 30–33 may well produce signals other than the single unsuppressed sideband, for example a signal in terms of $w_2 t$. Thus in a modified circuit (not shown) the attenuator 22 and the direct connection between the source 21 and the coil 15 are dispensed with and the radio frequency signal (in terms of the form $w_2 t$) is allowed to reach the coil 15 through the circuit 30 to 33 by unbalancing the latter.

The modified illustrated apparatus of FIGURE 2 is the same as the first one except that a single coil 50 is provided for both application of the alternating signals and for detecting the resonance. In this apparatus, a phase detector 51 is provided which is fed directly with the R.F. signal through a conductor 52. Except for the differences just mentioned, the FIGURE 2 apparatus is identical to that of FIGURE 1, and therefore the upper part of the apparatus is not repeated in FIGURE 2. The apparatus shown in FIGURE 1 may also include a phase detector instead of the crystal filter.

In either apparatus a further source of alternating signals of adjustable magnitude may be provided which is connected through similar circuits to that shown in FIGURE 1 to provide a further single unsuppressed sideband which is then applied to the matter under investigation to disturb a further spin-spin coupling.

I claim:

1. A magnetic resonance apparatus comprising a first source of alternating signals, a second source arranged to provide radio frequency signals for modulation by said alternating signals to produce two sidebands, means for suppressing one of the said sidebands, a polarizing magnet having poles providing a direct magnetic field across a predetermined location which is adapted to contain a gyromagnetic resonance sample, means for generating an alternating magnetic field across said sample location at a substantial angle relative to said direct magnetic field, and conductor means connected to receive said radio frequency signals and said unsuppressed sideband and to convey both to said alternating field generating means, whereby two alternating magnetic fields at said radio frequency and said sideband frequency, respectively, are produced, said radio frequency alternating magnetic field being adapted to drive a certain type of particle in said sample to gyromagnetic resonance and said sideband frequency field being adapted to disturb spin-spin coupling of said certain type of particle and another type of particle, thereby simplifying the resonance spectra of said certain type of particle.

2. Apparatus according to claim 1, said first source being adjustable to provide signals of different frequency.

3. Apparatus according to claim 1, said conductor means comprising at least in part separate sets of conductors, one set arranged to receive said radio frequency signals and the second set being arranged to receive said unsuppressed sideband.

4. Apparatus according to claim 3, in which said one set of conductors includes means for attenuating said radio frequency signals conveyed thereby.

5. A magnetic resonance apparatus comprising a first source of alternating signals, a second source arranged to provide radio frequency signals for modulation by said alternating signals to produce two sidebands, means for suppressing one of the said sidebands, a polarizing magnet having poles providing a direct magnetic field across a predetermined location which is adapted to contain a gyromagnetic resonance sample, means for generating an alternating magnetic field across said sample location at a substantial angle relative to said direct magnetic field, and conductor means connected to receive said radio frequency signals and said unsuppressed sideband and to convey both to said alternating field generating means, whereby two alternating magnetic fields at said radio frequency and said sideband frequency, respectively, are produced, said radio frequency alternating magnetic field being adapted to drive a certain type of particle in said sample to gyromagnetic resonance and said sideband frequency field being adapted to disturb spin-spin coupling of said certain type of particle and another type of particle, thereby simplifying the resonance spectra of said certain type of particle; said suppressing means comprising first, second, third and fourth modulation circuits, each of said modulation circuits being connected to both the first and the second source to receive from the second source radio frequency signals for modulation by signals received from the first source, and each of said modulation circuits having an output connected to an output of one of the other modulation circuits.

6. Apparatus according to claim 5, and comprising phase shifters located between said modulation circuits and said first and second sources to provide said first, second, third and fourth modulation circuits with signals represented respectively by sin $(w_1t+180)$, sin $(w_1t+270)$, sin $(w_1t)$ and sin $(w_1t+90)$ wherein $w_1$ is proportional to the frequency of said first source, and also to provide said first and third modulation circuits on the one hand and said second and fourth modulation circuits on the other hand with signals from said second source in quadrature and each shifted by 45° from the signals provided by the said second source.

7. A method of testing a volume of matter including at least two groups of particles which have different Larmor frequencies and which are spin-spin coupled, the method comprising the steps of modulating a radio frequency signal with an alternating signal to produce two sideband signals, substantially suppressing one of the said sideband signals, subjecting the said matter to both a polarizing direct magnetic field and to an alternating field derived from the said radio frequency signal and from the unsuppressed sideband signal, one of these signals being sufficiently strong and of such frequency to disturb the spin-spin coupling between the said two groups of particles whilst the other signal is of such frequency to effect resonance of one group, and detecting said resonance.

8. A method according to claim 7, said spin-span coupling being disturbed to such an extent that only a single resonance line from the said one group is produced for detection.

9. A method according to claim 7, said particles being nuclei.

10. The method according to claim 7, in which said one strong signal for disturbing the spin-spin coupling comprises said unsuppressed sideband signal, and said other signal effecting resonance comprises said radio frequency signal.

References Cited by the Examiner
UNITED STATES PATENTS

| | | | |
|---|---|---|---|
| 2,424,263 | 7/47 | Woodyard | 343—8 |
| 2,611,036 | 9/52 | Norgaard | 325—137 X |
| 2,836,722 | 5/58 | Dicke et al. | 324—0.5 |
| 2,973,483 | 2/61 | Stone | 331—43 |
| 3,068,399 | 12/62 | Bloch et al. | 324—0.5 |
| 3,147,428 | 9/64 | Anderson | 324—0.5 |

OTHER REFERENCES

Smaller: Physical Review, vol. 83, No. 4, Aug. 15, 1951, pp. 812–820 incl.

Villard: Proceedings of the I.R.E., vol. 36, No. 11, November 1948. pp. 1419 to 1425 incl.

CHESTER L. JUSTUS, *Primary Examiner.*

MAYNARD R. WILBUR, *Examiner.*